Figure 1:
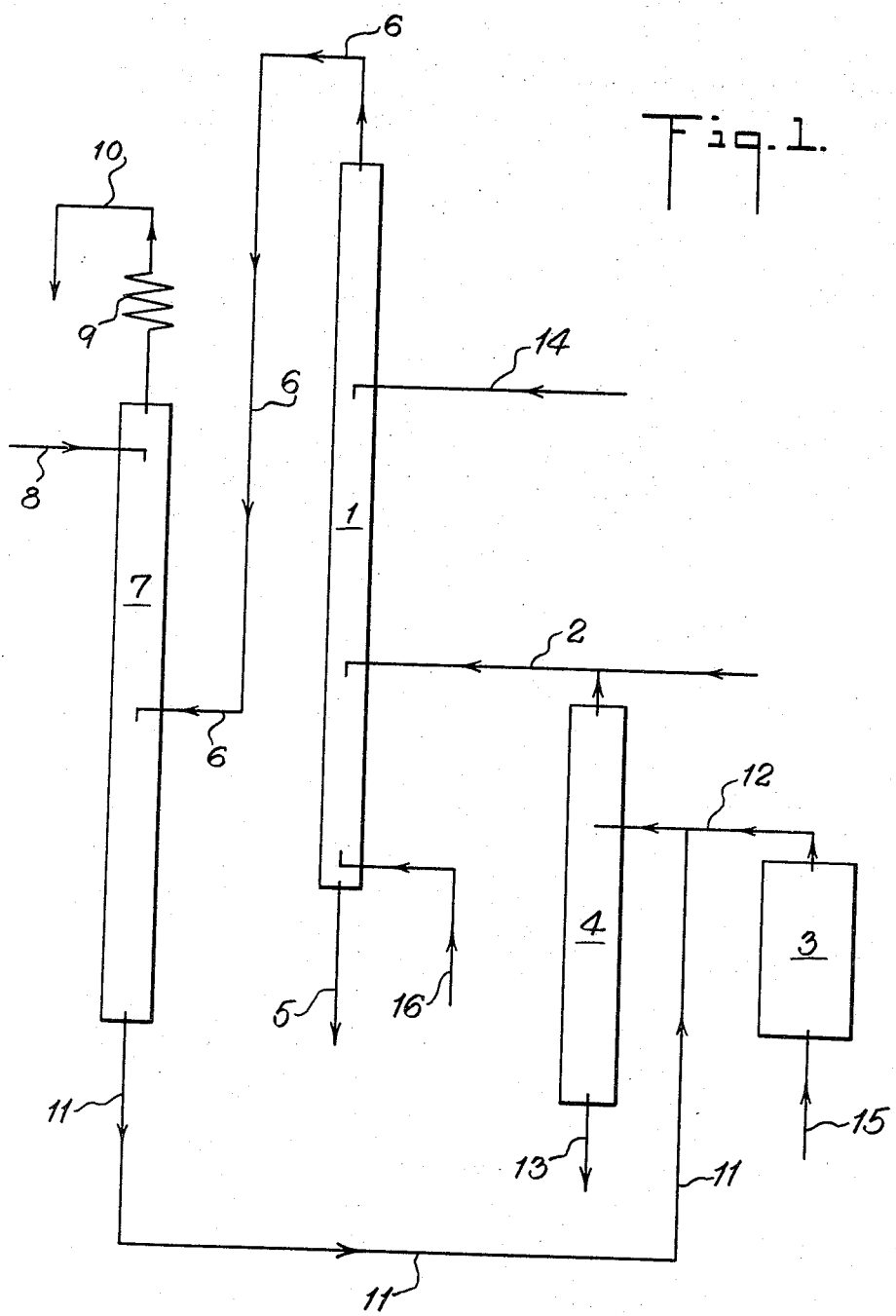

Sept. 12, 1967  G. KÜNSTLE ETAL  3,341,579
PREPARATION OF ACETIC ACID AND ALKYL CHLORIDES FROM
ESTER-ALCOHOL MIXTURES
Filed March 11, 1965  2 Sheets-Sheet 1

INVENTOR.
GERHARD KÜNSTLE
HERBERT SIEGL
BY
D. Malcolm
ATTORNEY

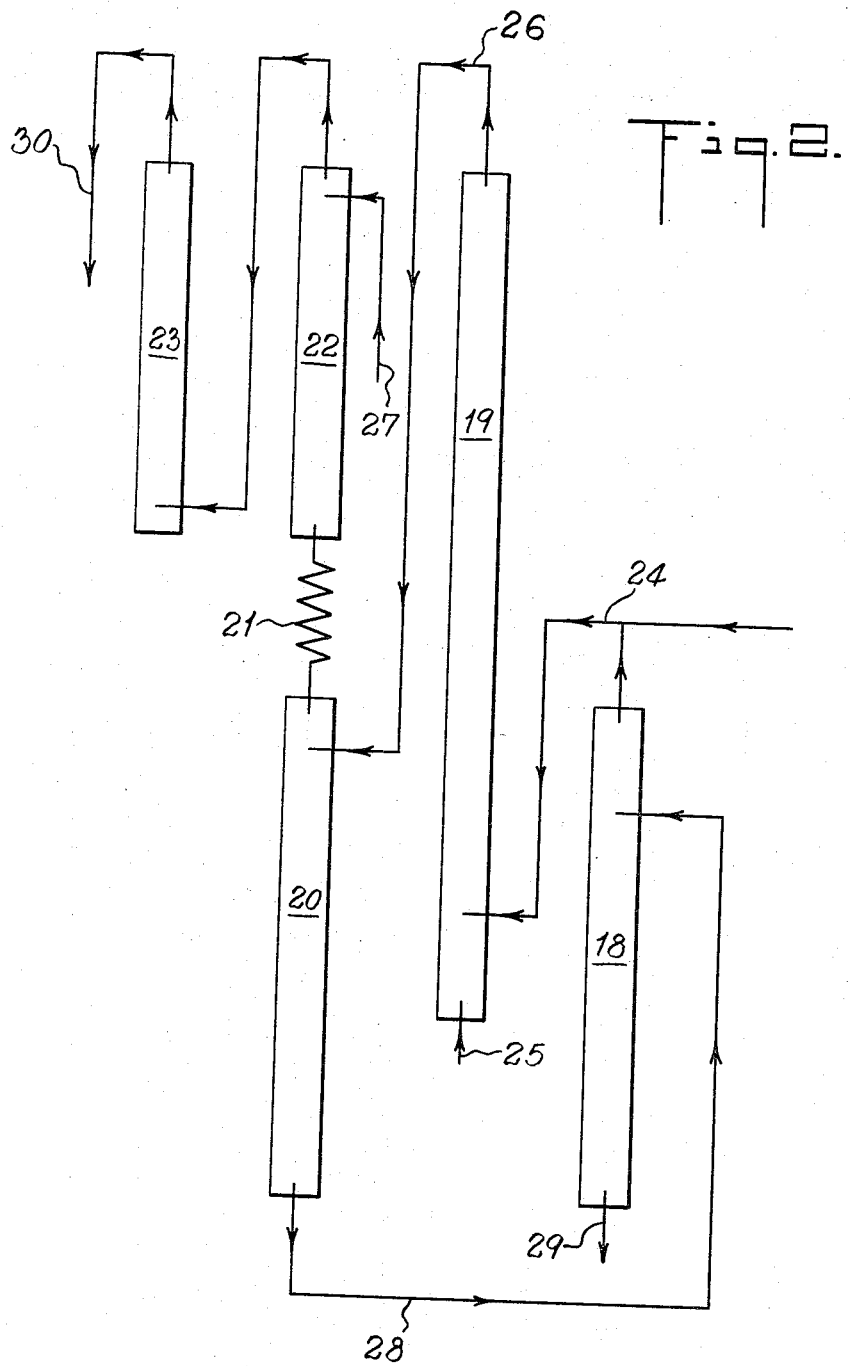

United States Patent Office 3,341,579
Patented Sept. 12, 1967

3,341,579
PREPARATION OF ACETIC ACID AND ALKYL CHLORIDES FROM ESTER-ALCOHOL MIXTURES
Gerhard Künstle and Herbert Siegl, Burghausen, Upper Bavaria, Germany, assignors to Wacker-Chemie G.m.b.H., Munich, Germany, a corporation of Germany
Filed Mar. 11, 1965, Ser. No. 438,968
Claims priority, application Germany, Mar. 13, 1964, W 36,389; Dec. 7, 1964, W 38,094
10 Claims. (Cl. 260—541)

This invention relates to processing ester-alcohol mixtures, and it has for its object to provide a novel and improved method of processing mixtures of this type which cannot easily be separated by conventional means.

Another object of the invention is to separate water-free as well as water-containing ester-alcohol mixtures without forming azeotropic mixtures and without undesirable side reactions, with a considerable saving in the consumption of power, with almost quantitative transformation, and with very satisfactory yields.

Various other objects and advantages will be apparent as the nature of the invention is more fully disclosed.

In various industrial processes large quantities of ester-alcohol mixtures are obtained which contain, beside the ester, the alcohol corresponding with the alcohol component of the ester, and cannot be used as such. For instance, when producing polyvinyl alcohol, one obtains comparatively large quantities of a methyl acetate-methanol mixture which cannot be marketed in that form. One is therefore forced either to process or to transform or to destroy such mixtures. The processing is made difficult due to the fact that most ester-alcohol pairs form azeotropic mixtures with each other, so that by fractional distillation with removal of the superfluous component one can, at best, get only as far as the composition of the azeotropic mixture. The latter must then be split up into its components, for instance by extractive distillation with distilling aids, such as water or glycols.

It has further been attempted to process technical ester-alcohol mixtures while avoiding a new azeotropic formation, by acidolysis with hydrogen chloride and formation of alkyl chlorides and organic acids. The troublesome reaction water which has been either carried in or formed is made harmless by the addition of corresponding quantities of fatty acid anhydride which transforms into fatty acid with water. In this method, particularly in the case of higher alcohol or water content in the technical ester-alcohol mixture, considerable quantities of valuable fatty acid anhydrides are consumed. Moreover, the removal of the formed alkyl chloride from the fatty acid-containing reaction mixture causes difficulties during the continuous processing and ends up incomplete. Also, without after-treatment it is not possible to obtain a reaction mixture that is free of hydrogen chloride—and thus an alkyl chloride that is free of hydrogen chloride.

We have now discovered an improved method of processing ester-alcohol mixtures which contain, beside the ester, the alcohol corresponding to the alcohol component of the ester. This is characterized by the fact that one adds hydrogen halide such as hydrogen chloride in the known manner to the ester-alcohol mixture and performs the transformation at a temperature not higher than 100° C. on filler bodies with large surface areas; the excess, if any, of the hydrohalic acid is drawn off at the lower end of the reactor; the reaction mixture which is free of hydrohalic acid is withdrawn continuously in vapor form at the upper end of the reactor; in a connected column the mixture is split, by adding water in the presence of a cation exchanger, into alkyl halide and an aqueous alcohol-acid mixture; and in a further column the water-containing acid is sluiced out and the remaining alcohol which may still contain ester, is circulated.

Generally in carrying out this process the hydrogen halide is introduced in gaseous form. However, it can also be used in the form of its aqueous solution. It is sufficient to use it in its stoichiometric quantity. In that case the reaction water together with the reaction mixture which is free of hydrohalic acid is removed continuously in vapor form at the upper end of the reactor. However, one can also use so much hydrogen halide that, in proportion to the alcohol contained in the alcohol-ester mixture, it is excessive. The quantity of the hydrogen halide may vary widely. In this case the excess of the hydrogen halide is proportioned in such a manner that it is sluiced out together with the reaction water at the lower end of the reactor.

In the obtained ester-alcohol mixtures the relative proportions of the two components ester and alcohol may be quite different, and perhaps they may correspond to the composition of the azeotropic mixture. If the aclohol content is low, one can pre-saponify the starting material by means of a cation exchanger to increase the throughput.

In a preferred embodiment one can reduce the ester content of the alkyl halide and thereby further increase the ester transformation, if one subjects the alkyl halide after its separation from the reaction mixture to a washing with water.

It is appropriate to proceed in such a manner that one places the necessary water in the top of coolable washing tower and feeds its sump runoff through the cooler to the head of the column which is connected to the transformation chamber. The alkyl halide escaping in gaseous form from the cooler is conducted through the washing tower from bottom to top. No noticeable hydrolysis of the alkyl halide takes place.

The quantity of water employed may vary within wide limits and it is practicable to adjust it in such a manner that organic acid forming in the column which comes after the transformation chamber—by hydrolysis of the ester—will become 15–35%. Likewise the temperature at which the washing is done may vary. It is expedient to keep it within the range of 0–25° C. However, since the washing effect at a given quantity of water becomes more favorable as the temperature goes down, the washing will be done under good cooling.

As suitable filler bodies with large surfaces there may be mentioned substances like activated charcoal, silica gel, pumice stone, aluminum oxide, also porous filler bodies from organic matter like polyethylene or polypropylene, which may contain cation exchangers which are not soluble in water to increase the throughput and which aid the esterification. The latter are used in the forms as described in H. Spes, G. Künstle & T. Altenschöpfer application Ser. No. 297,963, filed July 26, 1963. It is possible to obtain by this process alkyl halides as well as the organic acid in forms free of hydrohalic acid.

The advantage of our method is due to the fact that one can use water-free as well as water-containing ester-alcohol mixtures, avoiding the formation of azeotropic mixtures. The processing is done under very economical power-saving conditions, with almost quantitative transformation and with good yields.

It was surprising that when using water-containing hydrogen halide as well as water-containing starting materials the same good results can be obtained as when using water-free ester-alcohol mixtures or gaseous hydrogen halides.

It is further remarkable that during the separation of the alkyl halides from the reaction mixture no hydrolysis of the alkyl halide occurs in spite of the high temperature and the presence of water.

The invention is described in connection with the accompanying drawing, in which:

FIG. 1 is a diagrammatic illustration of a system suitable for carrying out the invention; and FIG. 2 is a diagrammatic view illustrating a modified system which is hereinafter described in connection with our Example 6.

In FIG. 1 of the drawing the ester-alcohol mixture as well as the hydrogen halide are piped into the reactor 1 in vapor form through line 2. If the ester-alcohol mixture has a high ester content, it is piped through line 15 into the reaction vessel 3 which contains a cation exchanger in the form of a solid bed filling, pre-saponified there and piped through line 12 into separator column 4, and after removal of the formed aqueous organic acid in separator column 4, it is piped in vapor form into reactor 1 through line 2. If an aqueous solution of the hydrogen halide is used, it is piped into the reactor 1 in liquid form through line 14. If the hydrogen halide is piped into reactor 1 separately, then line 16 is used.

Reactor 1 contains filler bodies with large surfaces containing a cation exchanger and is kept at a temperature between 50–100° C. If the reaction water is withdrawn in liquid form, when it may contain excess hydrogen halide, this is done by means of line 5. Otherwise the reaction water leaves reactor 1 in vapor form together with the formed alkyl halide and the ester still present through line 6 and is passed into column 7. This column contains porous, cation exchanger-containing filler bodies and is heated to a temperature of 50–70° C. Water is fed continuously to column 7 through line 8. Through an interposed water cooler 9 the alkyl halide is withdrawn in vapor form through line 10.

The saponification products formed in column 7, namely organic acid, alcohol and water, are fed into column 4 through line 11. The formed organic acid is sluiced out on the sump side together with the water through line 13, while the alcohol which may still contain some ester is fed into the reactor 1 in gaseous form through line 2.

Example 1

The apparatus described and illustrated in connection with FIG. 1 consists of a 200 cm. high separator column 4 with 50 mm. diameter, a 300 cm. high reactor 1 equipped with a jacket heater, with a diameter of 70 mm. which is supplied with cation exchanger-containing porous polyethylene filler bodies, and a 300 cm. high column 7 of 70 mm. diameter which is equipped with a water cooler 9 on top and is likewise filled with such filler bodies. The separator column 4 contains glass Raschig rings of 4 mm. diameter.

Through line 2, 715 g. of a methyl acetate-methanol mixture, consisting of 286 g. (8.94 mol) methanol and 429 g. (5.8 mol) methyl acetate, is fed in vapor form hourly into the lower third of reactor 1. Through line 16, 500 g. (13.7 mol) of gaseous hydrogen chloride is fed hourly to the lower end of the reactor. Reactor 1 is kept at a temperature of 80–100° C. The reaction product in gaseous form which is free of hydrogen chloride, containing formed methyl chloride, reaction water and untransformed methyl acetate, is fed through line 6 to the upper half of column 7. At the same time 760 g. of water is fed hourly to the upper third of column 7 through line 8 and the temperature of column 7 is kept at about 60° C. While the methyl chloride escapes practically quantitatively through the water cooler 9 into line 10, the methyl acetate is saponified into acetic acid and methanol and the saponification mixture is carried together with the water through line 11 into the upper half of the separator column 4. There the thinned aqueous acetic acid which is free of hydrochloric acid is withdrawn continuously through line 13, where 1207 g. of a 23.7% acetic acid is obtained hourly. The methanol leaves column 4 in vapor form and is fed through line 2 into reactor 1, as described above. Through line 10 one obtains hourly 767 g. of a hydrochloric acid-free mixture which consists on the average of 90.1% methyl chloride and 9.9% methyl acetate.

In case of a 100% transformation of hydrogen chloride, an 82.3% transformation of methyl acetate and a quantitative transformation of the inserted methanol and that formed by saponification, the yield of methyl chloride (100% pure) is 691 g. (13.69 mole), which is 99.9% with reference to the hydrogen chloride used and 99.9% with reference to the methanol used. The yield of acetic acid (100% pure) is 286 g. (4.77 mol), that is 100% with reference to the methyl acetate used.

Example 2

The apparatus used consists of a 40 cm. high advance column 3 with 150 mm. diameter, the 300 cm. high reactor 1 as described in Example 1, which is supplied with a mixture of equal parts of polyethylene-cation exchanger filler bodies described in Example 1 and activated carbon which is known under the trade name "Contarbon," and the separator column 4 and the column 7 described in Example 1. The advance column 3 is filled with 5 l. of a cation exchanger known under the trade name "Amberlite JR 120."

Into advance column 3 are fed hourly through line 15 from bottom to top at 50° C., 600 g. of an azeotropic methyl acetate-methanol mixture, consisting of 480 g. (6.48 mol) methyl acetate and 120 g. (3.75 mol) methanol as well as 650 g. water. Into the upper third of column 7, 500 g. of water is fed hourly through line 8. The pre-saponification mixture obtained at the upper end of the advance column 3 is carried through line 12 to the upper half of separator column 4, where on the top there is obtained a methyl acetate-methanol mixture free of acetic acid, which is fed in vapor form through line 2 into the lower third of reactor 1. Moreover, 348.5 g. (9.55 mol) of gaseous hydrogen chloride is fed hourly into reactor 1 through line 16. The temperatures and the further work method are the same as described in Example 1.

Hourly there is obtained through line 13, 1565 g. of a 22.2% aqueous acetic acid free of hydrochloric acid. Through line 10 one obtains hourly 532 g. of a mixture which on the average consists of 90.42% methyl chloride and 9.58% methyl acetate.

In case of a quantitative transformation of hydrogen chloride, 89.4% transformation of methyl acetate and a quantitative transformation of the original methanol and of that formed by saponification, the yield of methyl chloride (100% pure) is 481 g. (9.52 mol), which is 99.8% with reference to the hydrogen chloride used and 99.8% with reference to the methanol used. The yield of acetic acid (100% pure) is 348 g. (5.8 mol) which is 100% with reference to the methyl acetate used.

Example 3

The apparatus described in Example 2 is used, but the reactor diameter is widened to 80 mm., the reactor length is shortened to 200 cm., and line 11 is not connected with separator colume 4, but with line 15.

Into the advance column 3 is fed per hour through line 15, 600 g. of an azeotropic methyl acetate-methanol mixture consisting of 480 g. (6.48 mol) methyl acetate and 120 g. (3.75 mol) methanol and then one proceeds as described in Example 2. Into reactor 1 one feeds together with the vaporous methyl acetate-methanol mixture of the separator column 4, through line 2 hourly, 376 g. (9.54 mol) of gaseous hydrogen chloride. Reactor 1 is held at a temperature of 70–90° C. While at the lower reactor end 142 g. of a 19.7% aqueous hydrochloric acid is hourly sluiced out through line 5, the vaporous reactor head product, free of hydrogen chloride, is carried through line 6 into the upper half of column 7. At the same time there is fed into the upper third of column 7 hourly 625 g. of water, and the column temperature is kept at 60° C. While methyl chloride escapes into line 10 as described in Example 1, the saponification mixture together with the water is carried into advance column 3 by means of line 11 (since in this example line 11 is connected to line 15, as stated above).

Through line 13 one sluices out from separator column 4 hourly 972 g. of a 35.7% aqueous acetic acid free of hydrochloric acid. Through line 10 one obtains hourly 532 g. of a hydrochloric acid-free mixture which on the average consists of 90.26% methyl chloride and 9.74% methyl acetate.

In case of a 92.6% transformation of hydrogen chloride, an 89.2% transformation of methyl acetate and a quantitative transformation of the inserted methanol and that formed by saponification, the yield of methyl chloride (100% pure) is 480 g. (9.5 mol), which is 99.7% with reference to the hydrogen chloride used and 99.7% with reference to the methanol used. The yield of acetic acid (100% pure) is 347 g. (5.78 mol), which is 100% with reference to the methyl acetate used.

*Example 4*

The apparatus as described in Example 3 is used, and the procedure is as described in Example 3.

600 g. of an azeotropic methyl acetate-methanol mixture consisting of 480 g. (6.48 mol) methyl acetate and 120 g. (3.75 mol) methanol are fed in hourly. Moreover there are piped in 1554 g. of a 37.4% hydrochloric acid ($D^{20}$:1.187) through line 14 into reactor 1. 600 g. of water is fed hourly into column 7. Through line 5 hourly 1205 g. of a 19.25% aqueous hydrochloric acid are sluiced out, while through line 10 532 g. of a mixture consisting of 9.4% methyl acetate and 90.6% methyl chloride are obtained. Through line 13 one obtains hourly 1016 g. of a 34.3% aqueous acetic acid free of hydrochloric acid.

In case of a 60.05% transformation of hydrogen chloride, an 89.6% transformation of methyl acetate and a quantitative transformation of the inserted methanol as well as of that formed by saponification, the yield of methyl chloride (100% pure) is 482 g. (9.54 mol), which is 99.8% with reference to the hydrogen chloride used and 99.8% with reference to the methanol used. The yield of acetic acid (100% pure) is 348 g. (5.8 mol), which is 99.9% with reference to the methyl acetate consumed.

*Example 5*

The apparatus as described in Example 3 is used and the procedure is the same as in Example 3. The cooling water temperature of the cooler 9 is set at 23° C.

Into advance column 3 one feeds through line 15 hourly 508 g. of a mixture consisting of 440 g. (4.99 mol) ethyl acetate and 68 g. (1.48 mol) ethanol. Moreover into column 7 one feeds hourly 727 g. water and into reactor 1 through line 16 one feeds hourly 217 g. of gaseous hydrogen chloride.

The hourly yield is: 427 g. of a mixture consisting of 89.8% ethyl chloride, 8.44% ethyl acetate and 1.76% of a remainder (diethyl ether, water and ethanol), as well as 1030 g. of an aqueous 26.6% acetic acid free of hydrochloric acid.

With a quantitative transformation of hydrogen chloride, a 91.8% transformation of ethyl acetate and a quantitative transformation of the inserted ethanol as well as of that formed by saponification, the yield of ethyl chloride (100% pure) is 383.5 g. (5.94 mol) which is 100% with reference to the hydrogen chloride used and 98.1% with reference to the ethanol used. The yield of acetic acid (100% pure) is 274 g. (4.57 mol) which is 99.6% with reference to the ethyl acetate consumed.

*Example 6*

The apparatus illustrated in FIG. 2 is used in this Example. It consists of a 200 cm. high Raschig ring-equipped separator column 18 with a diameter of 5 cm., a 300 cm. high reactor 19 equipped with a jacket heater, with a diameter of 7 cm., charged with activated carbon known under the trade name of "Contarbon." Connected beyond the reactor 19 is a 400 cm. high column 20 with a diameter of 7 cm., whose lower third is filled with Raschig rings and the rest of it with porous polyethylene filler bodies containing a cation exchanger. Moreover, column 20 is equipped with a jacket heater and on its head it is equipped with a water cooler 21. On top of the latter is the washing tower 22 equipped with a cooler jacket and beyond that a drying tower 23 equipped with glass wool.

Through line 24 there are fed into the lower third of the reactor 19 hourly in vapor form 715 g. of a methyl acetate-methanol mixture, consisting of 286 g. (8.94 mol) methanol and 429 g. (5.8 mol) methyl acetate. Through line 25 one feeds into the bottom end of reactor 19 hourly 522 g. (14.3 mol) of gaseous hydrogen chloride. Reactor 19 is kept at a temperature between 80–100° C. The reaction product which is free of hydrogen chloride and is in vapor form, containing the methyl chloride that has been formed, reaction water and untransformed methyl acetate, is fed through line 26 into the upper third of column 20. At the same time one feeds at the upper end of washing tower 22 through line 27 hourly 760 g. water, and the temperature of washing tower 22 is kept at 2° C., the temperature of column 20 in the filler body part at 60–80° C., and in the Raschig ring part at 100–110° C.

There the methyl chloride escapes almost quantitatively from the reaction mixture fed into column 20, through cooler 21 into the washing tower 22. From thence the ester that has been carried out with the stream of methyl chloride gas, together with the washing water, is returned through cooler 21 into column 20. In the latter the methyl acetate is saponified into acetate acid and methanol, and the saponification mixture which is free of methyl chloride and hydrochloric acid, together with the water, is fed through line 28 into the upper half of the Raschig ring-separator column 18. There the thinned aqueous acetic acid is continuously withdrawn through line 29, where 124 g. of a 25.9% acetic acid is obtained per hour. The methanol leaves the Raschig ring-separator column 18 in vapor form and is fed into reactor 19 through line 24 as described above.

Through line 30 one obtains hourly 753 g. of a mixture free of hydrochloric acid, which contains on the average 95.75% methyl chloride and 4.25% methyl acetate.

Given a 100% transformation of hydrogen chloride, a 92.5% transformation of methyl acetate and a quantitative transformation of the methanol which has been supplied and formed by saponification, the yield of methyl chloride (100% pure) is 721 g. (14.27 mol), which is 99.9% referred to the hydrogen chloride used and 99.9% referred to the methanol used. The yield of acetic acid (100% pure) is 321 g. (5.35 mol) which is 100% referred to the methyl acetate used.

The invention claimed is:

1. Method of processing ester-alcohol mixtures selected from the group consisting of methyl acetate-methanol and ethyl acetate-ethanol, which comprises subjecting said ester-alcohol mixture to the action of hydrogen chloride at a temperature up to 100° C. in a reaction zone consisting essentially of large-surface filler bodies containing a cation exchanger, withdrawing any excess formed hydrochloric acid from the lower portion of said reaction zone, continuously withdrawing the reaction mixture free of hydrochloric acid from the upper portion of said reaction zone in vapor form, splitting said reaction mixture in the presence of water and a cation exchanger into alkyl chloride and an aqueous alcohol-acid mixture, removing the resulting reaction water containing acetic acid from said last-mentioned mixture, and circulating the remaining alcohol to said reaction zone.

2. Method according to claim 1, in which the reaction water and the excess hydrochloric acid are sluiced out of the lower portion of said reaction zone.

3. Method according to claim 1, characterized by the fact that the reaction water and the reaction mixture free of hydrochloric acid are continuously removed in vapor form from the upper portion of said reaction zone.

4. Method according to claim 1, in which hydrogen chloride is added to said ester-alcohol mixture in an amount which is at least a stoichiometric quantity as referred to the alcohol contained in said ester-alcohol mixture.

5. Method according to claim 1, in which the hydrogen chloride is introduced into said reaction zone in vapor form.

6. Method according to claim 1, in which the hydrogen chloride is introduced into said reaction zone in the form of an aqueous solution.

7. Method according to claim 1, in which the ester-alcohol mixture is pre-saponified in the presence of a cation exchanger before being introduced into said reaction zone.

8. Method according to claim 1, in which said filler bodies contain a water-insoluble cation exchanger to promote esterification and saponification.

9. Method according to claim 1, in which said alkyl chloride is subjected to washing with water after it is separated from the reaction mixture.

10. Method according to claim 9, in which the washing is done at a temperature of 0–25° C.

References Cited

UNITED STATES PATENTS

| | | | |
|---|---|---|---|
| 2,454,645 | 11/1948 | Galitzenstein et al. | 260—652 |
| 2,936,321 | 5/1960 | Mercier | 260—541 |

LORRAINE A. WEINBERGER, *Primary Examiner.*

VIVIAN GARNER, *Assistant Examiner.*